United States Patent
Carson

(10) Patent No.: US 6,210,468 B1
(45) Date of Patent: Apr. 3, 2001

(54) MULTIPLE WEIR SCRUBBER

(76) Inventor: William D. Carson, P.O. Box 2969, Renton, WA (US) 98056

(*) Notice: Subject to any disclaimer, the term of this patent is extended or adjusted under 35 U.S.C. 154(b) by 0 days.

(21) Appl. No.: 09/302,008

(22) Filed: Apr. 27, 1999

Related U.S. Application Data

(60) Provisional application No. 60/083,268, filed on Apr. 27, 1998.

(51) Int. Cl.$^7$ .................................................. B01D 47/02
(52) U.S. Cl. ................................. 95/226; 96/338; 96/339; 96/350
(58) Field of Search .................................. 95/226; 96/278, 96/279, 333, 329, 337, 338, 339, 340, 342, 350, 351

(56) References Cited

U.S. PATENT DOCUMENTS

| | | | |
|---|---|---|---|
| 978,739 | * 12/1910 | Griswold et al. | 96/339 |
| 1,363,331 | * 12/1920 | Livermore | 96/329 |
| 3,844,748 | * 10/1974 | Lanier | 96/342 |
| 4,005,999 | * 2/1977 | Carlson | 95/226 |
| 4,300,924 | * 11/1981 | Coyle | 96/351 |
| 5,520,714 | * 5/1996 | Muschelknautz | 95/226 |

* cited by examiner

Primary Examiner—Duane S. Smith
(74) Attorney, Agent, or Firm—R. Reams Goodloe, Jr.

(57) ABSTRACT

A scrubber for removal of contaminants from gas by liquid contact. The scrubber has a gas and liquid tight containment walls, to contain a gas stream through the scrubber, and to allow recirculation of scrubbing liquid, without the need for external power. A plurality of preferably annular, downwardly extending underflow weirs are provided to define therebetween a series of gas compartments. Preferably annular, upwardly extending overflow baffles are provided between adjacent underflow weirs, and liquid compartments are defined between the inner surface of an outer wall and the first overflow baffle, and between successive overflow baffles, if present. A charge of scrubbing liquid is provided, and gas is directed into the scrubber through an inlet nozzle, under the first underflow weir, over the first overflow baffle, and thence under the next underflow weir. Preferably, a mass transfer packing is provided in a tower after the last underflow weir, and more preferably, a final liquid level is maintained to allow flooding of the lower reaches of the mass transfer packing while gas is passed therethrough with sufficient velocity to attain efficient mass transfer. Mesh pad mist eliminators can also be provided before the clean gas exits the scrubber vessel. Alternately, parallelepiped shaped gas tight scrubbing units can be provided, containing a plurality of underflow weirs each followed by overflow baffles, where the overflow baffles include, near the bottom, liquid return apertures. The charge liquid can be changed by draining the scrubbing vessel and providing fresh scrubbing liquid.

21 Claims, 5 Drawing Sheets

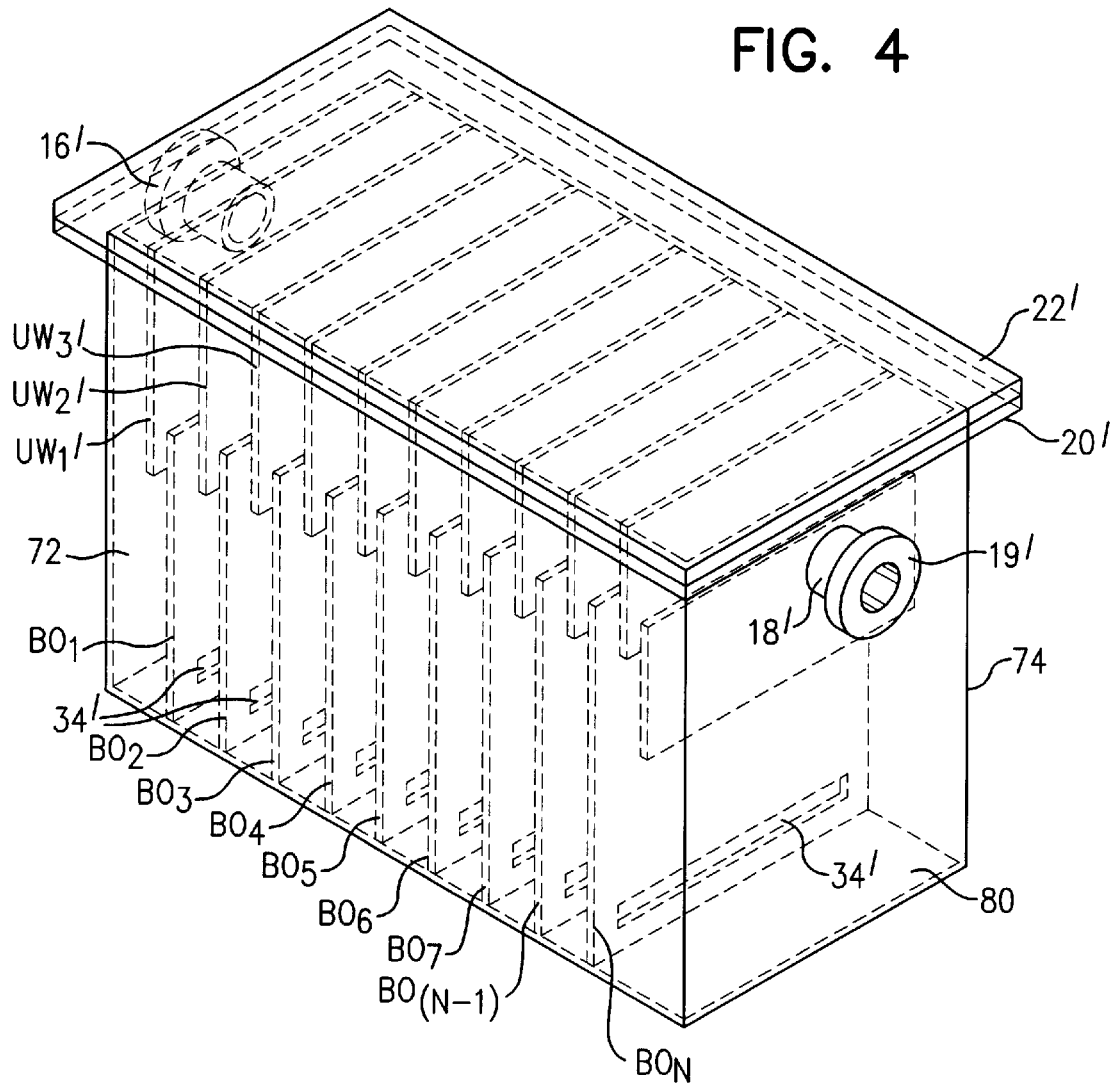

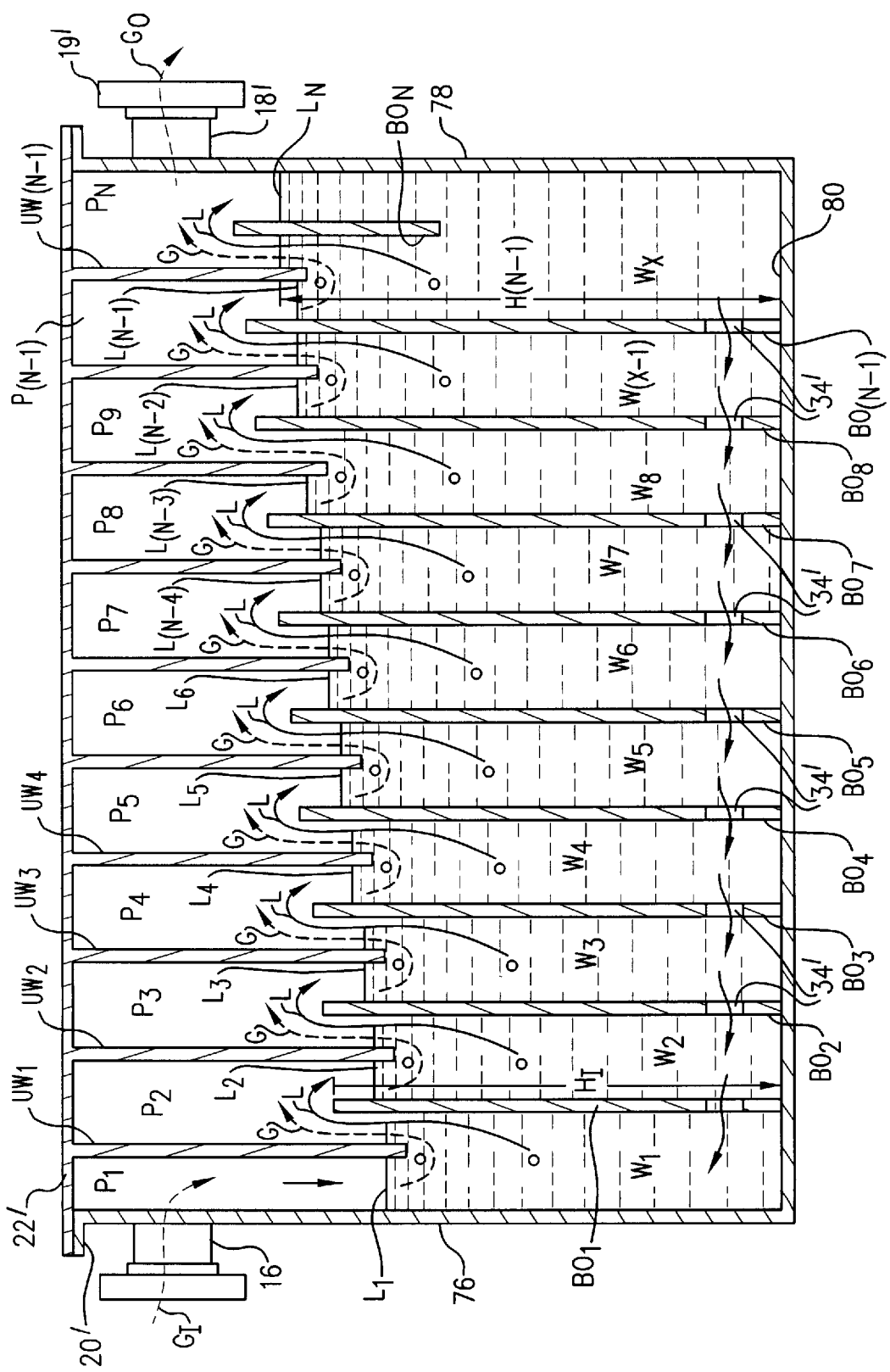

MULTIPLE WEIR SCRUBBER

This application claims priority to U.S. provisional application 60/083,286 filed Apr. 27, 1998.

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention is related to a novel apparatus for removing gaseous and particulate contaminants from a gas stream, and more particularly, to a novel gas scrubber and a method of use of the scrubber.

BACKGROUND

It is often necessary or desirable to remove contaminants from a bulk gas stream. Sometimes, process residuals must be eliminated from a carrier gas stream, and, in other applications, foul smelling or potentially hazardous or toxic compounds must be removed from a gas stream in order to satisfy safety and/or environmental concerns with respect to a potential or actual gaseous emission source.

I am aware of various attempts in which an effort has been made to improve the efficiency of a gaseous scrubber. For the most part, the efficiency of gaseous scrubbers which are known to me have one or more of the following shortcomings: (a) they generally require an independent liquid moving device, such as a pump, to effect liquid-gas contact, thus making them undesirable in applications where loss of electrical or other power source may be of concern; and (b) they often do not achieve a high separation efficiency in relatively simple equipment, in order to efficiently remove undesirable components from the exiting gas stream. Thus, the advantages of my simple, multiple-weir scrubber design, which may be utilized without an independent liquid moving device, in order to achieve high efficiency liquid scrubbing of an entering gas stream, are important and self evident.

OBJECTS, ADVANTAGES, AND NOVEL FEATURES

I have now invented, and disclose herein, a novel multiple weir scrubber design for enhancing the efficiency of contaminant removal from a gas stream. My scrubber design is simple, easy to manufacture, and otherwise superior to those designs heretofore used or proposed. In addition, it provides a significant, additional measure of efficiency in certain scrubber applications.

From the foregoing, it will be apparent to the reader that one important and primary object of the present invention resides in the provision of a multiple weir scrubber for improving the efficiency of removal of contaminants from a gas stream, by providing an improved liquid/gas contact flow path.

Other important but more specific objects of the invention reside in the provision of a multiple weir scrubber as described herein which:

can be manufactured in a simple, straightforward manner of materials suitable for the anticipated service;

in conjunction with the preceding object, have the advantage that they can be adapted by installation personnel to quickly fulfill a desired scrubbing requirement;

which utilize as a motive force the differential pressure between the gas inlet and the gas outlet for maintaining the liquid level in various compartments between successive weirs;

which can be manufactured in cylindrical shapes with annular weirs;

which can be manufactured in parallelepiped shapes, with planar weirs;

which in a relatively inexpensive manner, can improve performance, particularly removal efficiency, in scrubber applications.

Other important objects, features, and additional advantages of my invention will become apparent to the reader from the foregoing and from the appended claims and the ensuing detailed description, as the discussion below proceeds in conjunction with examination of the accompanying drawing.

SUMMARY

I have now invented, and disclose herein, a novel multiple weir apparatus useful for removing undesirable contaminants from a flowing gas stream. My scrubber device is designed for use to achieve high efficiency removal of contaminants without the necessity to provide mechanical circulation of the scrubbing liquid. The multiple weir scrubber receives, through an intake passageway, an incoming gas stream from which removal of certain gaseous or particulate components is desirable. The gas stream is received in the scrubber in a first gas chamber at pressure $P_1$ and turned downwardly into a first pool of scrubbing liquid with liquid level $L_1$. The gas stream components which are not absorbed by or reacted with the scrubbing liquid are allowed to escape downstream and upwardly after passing a first underflow weirs $UW_1$. The first underflow weir is preferably provided with a plurality of passageways, most preferably V-shaped notches at the lower reaches of the weir, to enhance gas-liquid contact as the gas passes under the first underflow weir $UW_1$. The gas stream then traverses a first overflow baffle $BO_1$ in a second gas chamber at pressure $P_2$. At that point, the gas stream is then directed downwardly and into a second pool of scrubbing liquid with liquid level $L_2$. The gas stream components which are not absorbed by or reacted with the second pool of scrubbing liquid are allowed to escape downstream and upwardly after passing a second underflow weir $UW_2$. The gas stream then traverses a second overflow baffle $BO_2$ in a third gas chamber at pressure $P_3$. The process is repeated as many times as desired, until the gas stream emerges from a final pool of scrubbing liquid at liquid level $L_N$ and into a final gas chamber at pressure $P_N$ from which it is discharged through a clean gas outlet.

In a preferred embodiment, the scrubbed gas flow passes exiting the final pool of scrubbing liquid passes through mass transfer packing, and more preferably additionally passes through a final mist eliminator (usually of the wire mesh type) before leaving the scrubber through a gas exit nozzle.

Importantly, energy from the gas pressure and gas movement circulates the scrubbing liquid within the scrubber. Similarly, the gas flow circulates final scrubbing liquid through the mass transfer packing bed. It is an important consequence that no liquid pump is required.

Scrubbing liquid is changed batchwise, as required. Alternately an underflow of scrubbing liquid can circulate counter-currently with respect to the flow of the gas to be scrubbed; it must be appreciated in such cases that a portion of scrubbing liquid flows co-currently with the gas flow over the successive overflow baffles.

Structurally, in a preferred, annular arrangement, the scrubber is supported by a conventional tank support skirt with a lower peripheral support ring. For batchwise applications, a drain line is provided in the lower reaches of the scrubbing liquid containing tank portion to allow removal of waste, contaminated scrubbing liquid, as well as the recharge of fresh scrubbing liquid. Alternately, a parallelepiped shape container may be used to employ my novel scrubber design.

My novel multiple weir scrubber device employs the differential pressure between the inlet and outlet gas flow in order to develop surface area for exposure between the bulk liquid and the bulk gas phases. The gas being scrubbed passes under a set of vee-shaped notches in weirs, and carries some liquid over successive overflow baffles, and carries some liquid into a final mass transfer packing bed. Importantly, the energy from the gas velocity and movement circulates liquid within the scrubber, and through the packed bed. Thus, an independent liquid moving device such as an electric drive pump, is not needed. This is an important advantage in emergency gas scrubber situations, or for gas streams containing combustible gas mixtures.

The novel multiple weir scrubber device described and claimed herein provides a high efficiency, and the unique advantage that no liquid pump is required, compared to conventional scrubbers for similar applications which are known to me. This performance factor is significant in various types of high performance air pollution control applications. There, the thorough liquid/gas mixing and fluid flow design made possible by my unique multiple weir scrubber makes feasible a lower cost, yet more efficient scrubber design for many applications. Moreover, the improvement provided by my multiple weir scrubber device are manifested in cleaner exit gas, and in the elimination equipment for liquid recirculation, which results in lower operating costs.

BRIEF DESCRIPTION OF THE DRAWING

FIG. 4 is a perspective view of a second embodiment of my multiple weir scrubber, now showing the design embodied in a parallelepiped vessel, with successive underflow weirs and overflow baffles between gas inlets and outlets.

FIG. 5 is a vertical cross-sectional view of the embodiment just set forth in FIG. 4, now showing operational details including successive scrubbing liquid levels in various sections of the device.

DESCRIPTION

Figure 1:
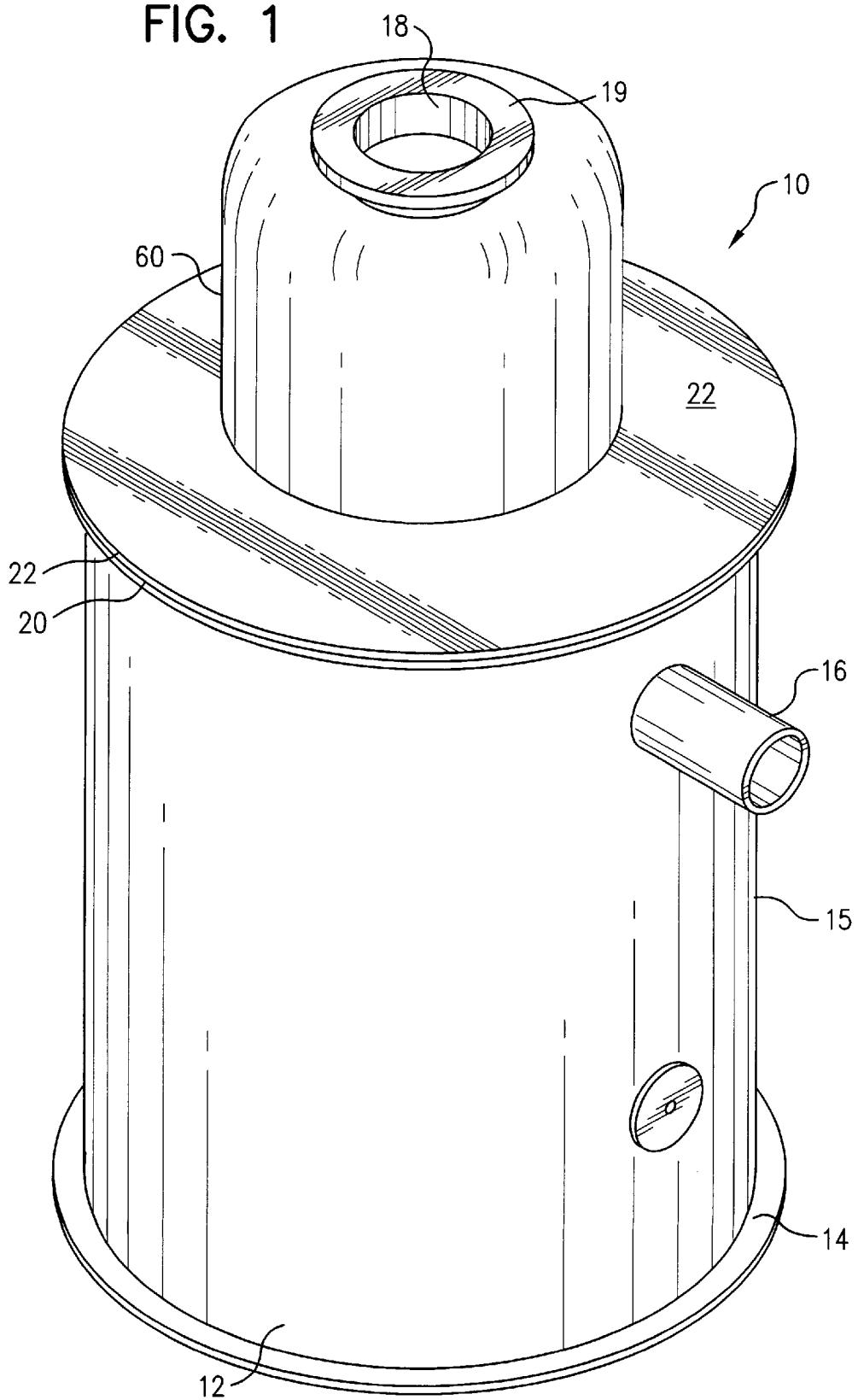
FIG. 1 is a perspective view of one embodiment of my multiple weir scrubber, showing a version which uses a plurality of annular weirs disposed within a cylindrical vessel, and which utilizes a final mass transfer packed bed tower.

Attention is now directed to FIG. 1, wherein an external perspective view of the first embodiment of my multiple weir scrubber 10 is shown. The scrubber 10 is structurally supported by a conventional tank support skirt 12 with lower tank support ring 14. Skirt 12 preferably continues integrally upward to provide pressure vessel walls 15 for containment of gas being scrubbed as well as scrubbing liquid, as further described below in connection with the description of FIG. 3. Returning to FIG. 1, at least one gas inlet 16 is provided for receiving the gas to be scrubbed, and at least one gas outlet 18, shown with flanges 19, is provided for discharging cleaned gas from scrubber 10.

Figure 2:
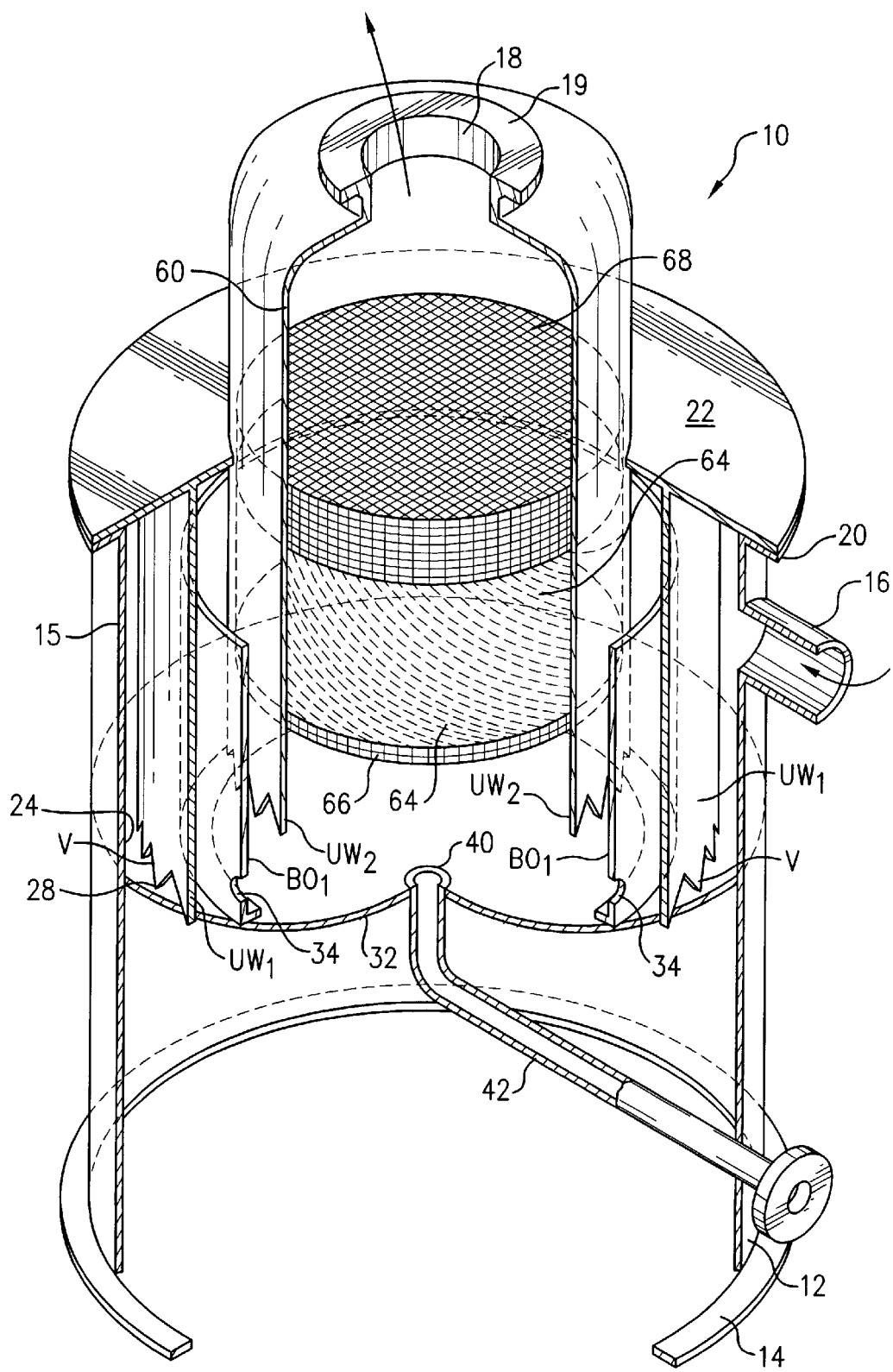
FIG. 2 is a partially broken away perspective view, showing the interior details of the multiple weir scrubber first set forth in FIG, including underflow weirs, an overflow baffle, a final packed bed, and a final mist eliminator prior to the gas outlet.

As more clearly see in FIG. 2, an upper, preferably annular flange 20 sealingly supports a lid 22 from which is downwardly suspended one or more underflow weirs, a first one of which is shown as weir $UW_1$ in FIG. 2. As shown in this embodiment, the underflow weir $UW_1$ is an annular ring spaced inwardly a pre-selected distance from the interior wall portion of the outer vessel wall 24. A plurality of passageways, preferably vee-shaped notches V, are provided at the lower reaches 28 of weir $UW_1$ for encouraging bulk gas-liquid contact, as an incoming gas stream is forced downward and under weir $UW_1$.

Next, a first overflow baffle $BO_1$ is supported upwardly from the preferably downwardly dished liquid head 32. As shown in this FIG. 2, the first overflow baffle $BO_1$ is in the shape of a thin annulus. At or near the bottom of the overflow baffle $BO_1$ one or more, and preferably four or more "rat-hole" passageways 34 are provided to allow flow of scrubbing liquid between the upstream side U and the downstream side D of the overflow baffle $BO_1$.

A second underflow weir $UW_2$ is depicted manufactured integrally with, and disposed as part of, the vessel sidewalls of exit gas scrubber 39. As depicted in this FIG. 2, the second underflow weir $UW_2$ is also in the shape of a thin annulus with a plurality of vee-shaped notches V disposed in a full circle along the lower reaches of the baffle $BU_2$.

A drain exit 40 is provided at the lower reaches of liquid head 32, to allow draining of scrubbing liquid via drain line 42, through drain valve 44.

Ideally, in order to save equipment costs, the walls 50 which form second underflow weir $UW_2$ extend upwardly, preferably vertically, to provide wall 60 that contains mass transfer packing bed 64 which is supported from a lower packing support 66. Also, it is desirable to utilize a mist eliminator 68 downstream of the mass transfer packing 64. Although mesh pad type mist eliminators are depicted, any convenient type meeting the desired exit gas quality requirements may be utilized. Also, it should be noted that a vapor/liquid disengagement space of height E is provided to further allow liquid droplets 70 to return downward into the mesh pad 68 and the packing bed 64.

Figure 3:
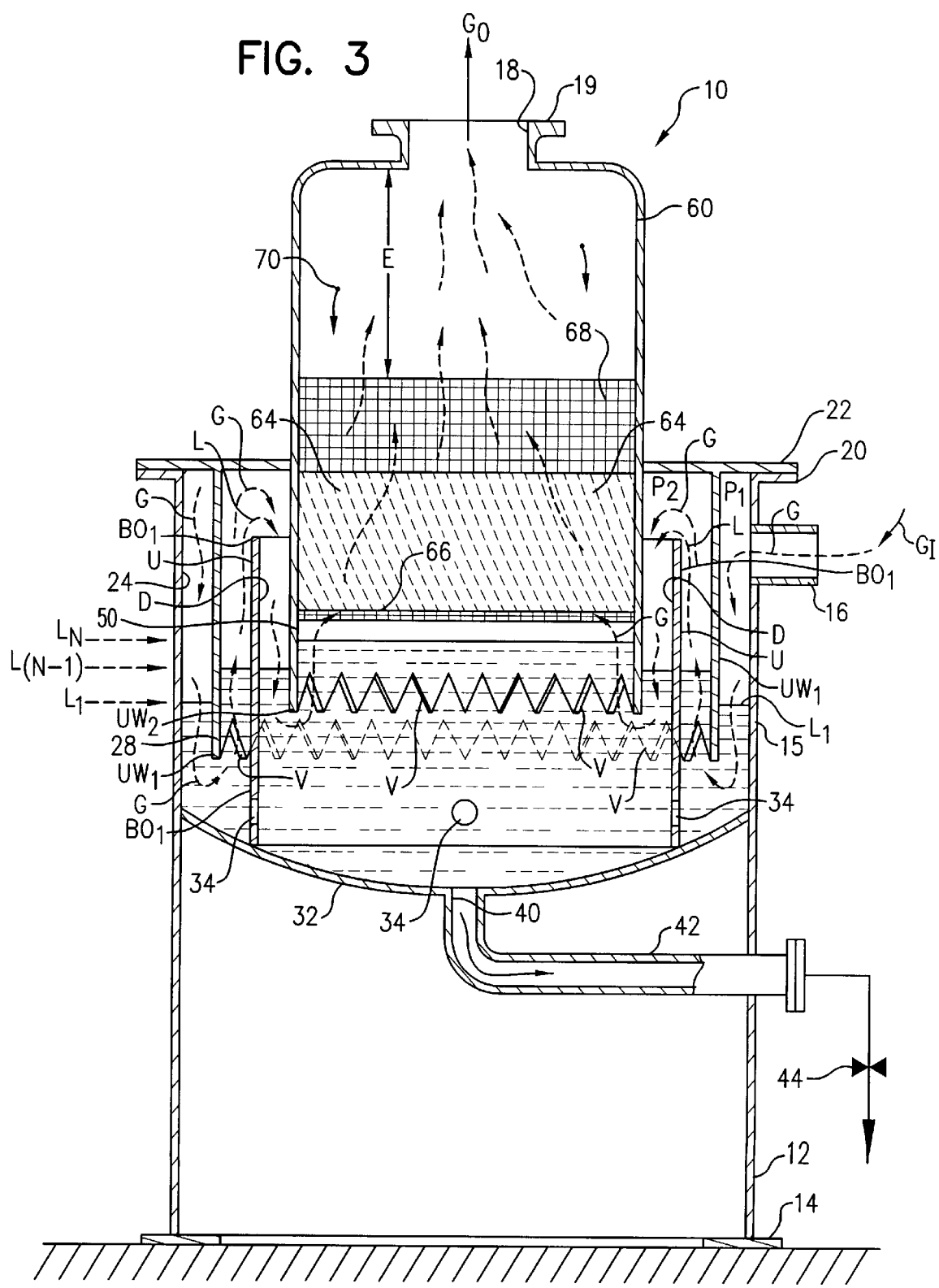
FIG. 3 is a vertical cross-section of the embodiment just set forth in FIGS. 1 and 2, now showing the operation via depicting liquid levels in various compartments, and the direction of gas and liquid flows.

Turning now to FIGS. 3 and 5, the operation of my multiple weir scrubber is depicted in further detail. Inlet gas $G_I$ at inlet gas pressure $P_I$ is supplied to the one or more inlet nozzles 16. Outlet gas $G_O$ at outlet gas pressure $P_O$ leaves the scrubber 10 at one or more gas outlets 18. The differential between the inlet gas pressure $P_I$ and the outlet gas pressure $P_O$ drives the operation of the scrubber 10. The scrubber is segmented into multiple gas compartments at pressure P, each of which gas compartments are bounded on the top by the scrubber lid 22, below by a liquid at a level L corresponding to that particular compartment, and the configuration show in FIGS. 1, 2, and 3, by successive underflow weir UW. Note that when a parallelepiped shape is utilized as shown for scrubber 10' in FIGS. 4 and 5, then opposing first 72 and second 74 sidewalls also form part of each gas compartment boundary, as does the lid 22'. Also, the inlet end wall 76 and outlet end wall 78 provides containment at the inlet and outlet, respectively.

Gas compartments are provided in a series of at pressures $P_1$, $P_2$, $P_{(N-2)}$, $P_{(N-1)}$ and so on to $P_N$, where N is an integer corresponding to the number of gas compartments. For example, in FIG. 4, N=11. The liquid level in each of the successive gas compartments is shown as $L_1$, $L_2$, $L_3$, and so on in a series to $L_{(N-2)}$, $L_{(N-1)}$ and finally to $L_N$. At the entering side where pressure $P_1$ is high, the liquid level $L_1$ is low, and likewise, at the gas outlet side where pressure $P_N$ is low, the liquid level $L_N$ is low. The interstage gas compartment pressures decrease, and liquid levels increase, in a self adjusting manner, between the first and last gas compartments. In each gas compartment, and overflow baffle BO is positioned to force the gas over the baffle as the influent gas enters that particular gas compartment.

Significantly, adjacent pairs of overflow baffles BO separates liquids between liquid compartments, which liquid compartments $W_1$, $W_2$, $W_3$, etc., to $W_{(X-1)}$, $W_X$, are inter-fittingly staged between gas compartments, as can be more clearly seen in FIG. 5. At the overflow baffles BO, the liquid is forced over the overflow baffles from one liquid compartment to the next, for example, from W1 to W2, in the same direction as the gas. In this regard, the natural flow of liquid is co-current flow, assuming the liquid return openings 34' in the overflow baffles BO are open; the return openings 34' are normally located at or near the bottom 80. When the scrubber 10 or 10' is not operating, then the liquid level in each gas compartment will equalize, and become singular. At such a condition, the liquid level in each gas compartment is set by its overflow baffle BO height H above the bottom 80. The highest differential pressure across the scrubber at no flow is equivalent to a column of liquid with a height equal to the distance between the first and last weir. On startup, as the differential pressure increases across the scrubber, gas flow will start.

During scrubbing operations, the vee-notches V on the underflow weir uniformly distribute the flowing gas over the width or circumference of the underflow weirs UW. As the gas G passes between the weir and the baffle, it entrains liquid L, as indicated by the appropriately labeled arrows in FIGS. 3 and 5. The spacing between the weir UW and the baffle BO is preferably narrow, so that the gas G induces the upward flow of the liquid L. Hence, scrubbing liquid L is carried co-currently with the gas G, and the scrubbing liquid from any particular pool of scrubbing liquid in a chamber $W_1$, $W_2$, etc., is deposited on the downstream or far side of the then current overflow baffle BO, to the next liquid compartment, e.g, liquid from compartment $W_1$ is deposited in compartment $W_2$, and the process is repeated downstream, as most clearly evident in FIG. 5. A liquid flow path is provided for the liquid to return to the upstream side of the overflow baffle BO, for example, by way of rat-holes 34 shown in FIG. 3, or underflow passageways as seen in FIG. 5. Such liquid flow continuously recirculates contact liquid and insures that the entire scrubbing liquid volume is mixed.

The liquid-gas contact area is developed as the gas gasses beneath the underflow weir UW, and in the narrow space between the underflow weir UW and the overflow baffle OB. In this latter narrow space, the two phases due to the entrainment of liquid, a large amount of interfacial area is created. Each pair combination of underflow weir UW and overflow baffle BO can approach a theoretical plate of mass transfer efficiency. Thus, in my novel multiple weir scrubber, combinations of pre-selected number of weirs and baffles can develop sufficient mass transfer to achieve most any degree of mass transfer desired.

With respect to particulate removal, as the gas stream is forced beneath the liquid, the gas becomes a discontinuous phase. With the gas dispersed in the liquid, particles present in the gas are captured by two mechanisms—impingement, and Brownian motion. Particulates in the gas are wetted as they pass between the underflow weir UW and the overflow baffle BO. Consequently, particulate removal is very good, typically ninety five percent (95%) or better, for particles five (5) microns and larger at underflow weir/overflow baffle pair.

In one variation of my cylindrical unit design, when using a gas flow path inward from the outer wall to the center, an added feature can be incorporated into the design. Specifically, since operation can raise the liquid level at the center by several inches, the unit height can be designed so that the liquid level in the center (shown as $L_N$ in FIG. 3), can rise so as to flood the lower section of the packed bed 64. The ratio of the cross-sectional area of the outer gas compartment to the innermost gas compartment (located below the packed bed support 66) will have a multiplying effect on the potential liquid level change. This same effect can produce a high gas velocity through the flooded section. Thus, the high velocity gas will entrain the accompanying liquid, thus wetting the mass transfer packing 64 far above the flood level in the mass transfer section 64. This action increases the gas-liquid contact area, and thus enhances the mass transfer of components between the gas and liquid phases.

Although the my multiple weir scrubber can have various design configurations, such as a parallelepiped box with a substantially rectangular cross-section in plan view, as shown in FIG. 5, or cylindrical with a substantially circular cross-section in plan view, the essential workings are the same. That is, regardless of the physical arrangement, the functional arrangement is that the various underflow weirs UW and the overflow baffles BO function similarly. Likewise, the ring-like, preferably cylindrical arrangement can have gas flow radially from the center to the outer wall, or vice-versa, as depicted in FIGS. 1, 2, and 3. Moreover, additional enhancements, such as the recirculation of liquid between stages, or withdrawal of scrubbing liquid at a desired interstage location with fresh scrubbing liquid being supplied at the first liquid compartment or at another desired location, may be employed without departing from the teachings hereof.

It is thus to be appreciated that my novel multiple weir scrubber is an appreciable improvement in the state of the scrubbing contaminated gas streams, particularly for applications where continued operation is important when electricity is not available, or where the presence of electrical equipment is undesirable. Although only a few exemplary embodiments of this invention have been described in detail, it will be readily apparent to those skilled in the art that my novel multiple weir scrubber, and the method of scrubbing which may be implemented utilizing the apparatus, may be modified from those embodiments provided herein, without materially departing from the novel teachings and advantages provided by this invention, and may be embodied in other specific forms without departing from the spirit or essential characteristics thereof. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, the drawing, and the abstract) may be combined in any combination, except combinations where at least some of the features are mutually exclusive. Alternative features serving the same or similar purpose may replace each feature disclosed in this specification (including any accompanying claims, the drawing, and the abstract), unless expressly stated otherwise. Thus, each feature disclosed is only one example of a generic series of equivalent or similar features. The intention is to cover all modifications, equivalents, and alternatives falling within the scope and spirit of the invention, as expressed herein above and in the appended claims. As such, the claims are intended to cover the structures, apparatus, and methods described herein, and not only the equivalents or structural equivalents thereof, but also equivalent structures or methods. The scope of the invention, as described herein and as indicated by the appended claims, is thus intended to include variations from the embodiments provided which are nevertheless described by the broad meaning and range properly afforded to the language of the claims, as explained by and in light of the terms included herein, or the equivalents thereof.

What is claimed is:

1. A scrubber, said scrubber using liquid for scrubbing one or more substances from an inlet carrier gas, said scrubber comprising:
    (a) a substantially cylindrical shaped vertically oriented tubular outer wall having a support base and an interior wall portion, said outer wall further comprising a gas inlet and an upper end support portion;
    (b) a tank bottom sealingly affixed to at a selected location to said interior wall portion;
    (c) a tank lid, said tank lid sealingly affixed to said upper end support portion;
    (d) a first underflow weir, said first underflow weir downwardly supported from said lid, and extending to a lower end portion, said first underflow weir substantially annular in shape and located radially inward from said interior wall portion;
    (e) a first overflow baffle, said first overflow baffle substantially annular in shape and located radially inwardly from said first underflow weir, said first overflow baffle extending upwardly from said tank bottom to a point above said lower end portion of said first underflow weir to an upper end portion, said first overflow baffle further comprising, at or near the bottom thereof, one or more liquid passageways, said passageways sized to allow flow of said scrubbing liquid therethrough;
    (f) a second underflow weir, said second underflow weir downwardly supported from said lid, said second underflow weir spaced radially inward from said first overflow baffles, said second underflow weir extending downwardly below said upper end portion of said first overflow baffle;
    (g) a gas outlet, said gas outlet situated radially inward from said second underflow baffle.

2. The scrubber as set forth in claim 1, wherein said second underflow weir further comprises a vertical tower portion, said vertical tower portion protruding upward through said lid and circumferentially extending to form interior walls, and wherein said interior walls extend upwardly to an upper end portion.

3. The scrubber as set forth in claim 2, wherein said gas outlet is affixed to said upper end portion of said vertical tower portion.

4. The scrubber as set forth in claim 2 further comprising a mass transfer packing bed, said mass transfer packing bed comprising (a) a support portion secured to said interior walls, and
    (b) a packing portion extending upwardly from said support portion and extending laterally between said interior walls.

5. The scrubber as set forth in claim 4, further comprising a mist eliminator, said mist eliminator affixed above said mass transfer packing in said vertical tower portion.

6. A scrubber, said scrubber for scrubbing one or more substances from an inlet carrier gas by using a liquid, said scrubber comprising:
    (a) a plurality of gas compartments, said gas compartments described by the sequence $G_1, G_2, \ldots G_N$, where N is a positive integer;
    (b) a plurality of liquid compartments X, said liquid compartments described by the sequence $W_1, W_2, \ldots W_X$, where X is a positive integer;
    (c) wherein said liquid compartments are defined by a adjacent overflow baffles, in a sequence of overflow baffles, and wherein said gas compartments are defined by adjacent underflow weirs, in a sequence of underflow weirs, and wherein
        (i) said sequence of underflow weirs comprise a sequence of underflow weirs from a first underflow weir $UW_1$, through an Nth underflow weir $UW_N$, and corresponding to a number N of gas compartments, and
        (ii) said sequence of overflow baffles comprise a sequence of overflow baffles from a first overflow baffle $BO_1$ through to an Nth overflow baffle $BO_N$, where N is a positive integer, each of said overflow baffles following, with respect to liquid flow, one of said underflow weirs in said sequence of underflow weirs $UW_1$ to $UW_N$; and
    (d) a gas-tight and liquid tight casing, said casing having a tank bottom portion, and further comprising
        (i) a contaminated a gas inlet before said first underflow weir $UW_1$,
        (ii) a clean gas outlet after said last overflow baffle $OB_N$, and
        (iii) wherein each of said overflow baffles extends upwardly from said tank bottom portion, to a point above said lower end portion of an adjacent, gas flow upstream, underflow weir, to an upper end portion, and wherein each of said overflow baffles further comprises, at or near the bottom thereof, one or more liquid passageways, said passageways sized to allow flow of said scrubbing liquid therethrough.

7. The scrubber as set forth in claim 6, wherein said casing is generally tubular in shape.

8. The scrubber as set forth in claim 7, wherein each of said underflow weirs comprise a generally tubular underflow weir element of preselected downwardly disposed dimension K and terminate at a lower end portion.

9. The scrubber as set forth in claim 7, wherein each of said overflow baffles comprise a (generally tubular overflow baffle of pre-selected upwardly disposed height H terminating at an upper end portion.

10. The scrubber as set forth in claim 1 or claim 6, wherein each of said overflow baffles extends a height H from a bottom portion to a top portion, and wherein at or near said bottom portion, a plurality of liquid passageway portions is provided between a downstream side and an upstream side of said overflow baffle, said downstream side and said upstream side being with respect to gas flow in said scrubber.

11. A scrubber for interface between a gas stream and a liquid, said scrubber structure comprising:
   (a) a parallelepiped shaped gas tight container, said container having
      (i) a bottom
      (ii) a lid
      (iii) a first sidewall
      (iv) a second side wall
      (v) an inlet end with an inlet for introduction of a gas stream, and
      (vi) an outlet end with an outlet for discharge of a gas stream;
   (b) a plurality of spaced apart underflow weirs, said underflow weirs downwardly supported from said lid to a lower end portion, each of said underflow weirs substantially planar in shape and extending between said first and said second sidewalls;
   (c) a plurality of spaced apart overflow baffles, each of said overflow baffles substantially planar in shape and extending upwardly from said bottom to an upper end portion between said first and said second sidewalls, each of said spaced apart overflow baffles
      (i) located downstream, with respect to gas flow, of one of said underflow weirs, and
      (ii) extending upwardly higher than said lower end portion of an immediately upstream underflow weir.

12. The scrubber as set forth in claim 11, wherein one or more of said plurality of overflow baffles further comprises, at the lower reaches thereof, one or more liquid return apertures, each of said liquid return apertures defined by edge wall portions.

13. The scrubber as set forth in claim 11, wherein the lower end portion of each underflow weir terminates below the elevation of the upper end portion of the downstream overflow weir, to provide a plurality of liquid compartments between adjacent overflow baffles to hold sufficient liquid into which intervening underflow weirs protrude, so that a gas stream entering a gas compartment bounded by said roof, said first and second sidewalls, and an adjacent pair of underflow weirs is forced under the next downstream underflow weir before traveling into the next gas compartment and over the next downstream overflow weir.

14. The scrubber as set forth in claim 13, wherein during operation a sequence of gas compartments a successively lower pressure is provided from said gas inlet to said gas outlet, and wherein gas is scrubbed by passage under one of said plurality of underflow weirs before passage into the next downstream gas compartment.

15. The scrubber as set forth in claim 1, or in claim 6, or in claim 11, wherein each of said underflow weirs further comprises, at the lower end portion thereof, a plurality of gas liquid interface structures.

16. The scrubber as set forth in claim 15, wherein each of said gas-liquid interface structures comprises a plurality of V-shaped notches.

17. A method for scrubbing a gas to remove undesirable components therefrom said method comprising:
   (a) providing scrubber vessel, said scrubbed vessel comprising
      (1) a plurality of gas compartments, said gas compartments described by the sequence $G_1, G_2 \ldots G_N$, where N is a positive integer;
      (2) a plurality of liquid compartments X, said liquid compartments described by the sequence $W_1, W_2, \ldots W_x$, where X is a positive integer;
      (3) wherein said liquid compartments are defined by a adjacent overflow baffles, in a sequence of overflow baffles, and wherein said gas compartments are defined by adjacent underflow weirs, in a sequence of underflow weirs, and wherein
         (A) said sequence of underflow weirs comprise a sequence of underflow weirs from a first underflow weir $UW_1$, through an Nth underflow weir $UW_N$, and corresponding to a number N of gas compartments, and
         (B) said sequence of overflow baffles comprise a sequence of overflow baffles from a first overflow baffle $BO_1$ through to an Nth overflow baffle $BO_N$, where N is a positive integer, each of said overflow baffles following, with respect to liquid flow, one of said underflow weirs in said sequence of underflow weirs $UW_1$ to $UW_N$; and
      (4) a gas-tight and liquid tight casing, said casing having a tank bottom portion, and further comprising
         (A) a contaminated a gas inlet before said first underflow weir $UW_1$, and
         (B) a clean gas outlet after said last underflow weir $UW_N$;
         (C) and wherein each of said overflow baffles extends upwardly from said tank bottom portion, to a point above said lower end portion of an adjacent, gas flow upstream, underflow weir, to an upper end portion, and wherein each of said overflow baffles further comprises, at or near the bottom thereof, one or more liquid passageways, said passageways sized to allow flow of said scrubbing liquid therethrough
   (b) charging said scrubber vessel with an initial charge of scrubbing liquid;
   (c) directing a gas stream to be scrubbed through said gas inlet, to pressurize said first gas compartment $G_1$, and then allowing a portion of gas to escape past said first underflow weir $UW_1$ and into said second gas compartment $G_2$ of said plurality of gas compartments, and thence sequentially through each of said gas compartments to the last of said gas compartments $G_N$ by alternately traveling under the then next underflow weir UW and over the then next overflow baffles OB;
   (d) directing said gas stream outward through said clean gas outlet.

18. The method as set forth in claim 17, further comprising the step of directing the gas stream escaping the last of said underflow weirs into a mass transfer packing structure, and wherein said mass transfer packing structure is flooded, at the lower reaches thereof, by said liquid at a final liquid level $L_N$.

19. The method as set forth in claim 18, further comprising passing said gas stream, upon exit from said mass transfer packing structure, through a mist eliminator.

20. The method as set forth in claim 19, wherein said mist eliminator comprises metal mesh type mist eliminators.

21. The method as set forth in claim 17, wherein said liquid further comprises a first reactant, and wherein said gas contains a second reactant, and wherein said second reactant is substantially removed from said gas stream by reaction with said first reactant during passage of said gas through said liquid in said scrubber.

* * * * *

UNITED STATES PATENT AND TRADEMARK OFFICE
CERTIFICATE OF CORRECTION

PATENT NO. : 6,210,468 B1
DATED : April 3, 2001
INVENTOR(S) : Carson, William D.

It is certified that error appears in the above-identified patent and that said Letters Patent is hereby corrected as shown below:

Column 3,
Line 47, after the words "set forth in", delete [FIG,] and substitute therefore -- FIG. 1, --.

Column 4,
Line 10, after the word "clearly", delete [see] and substitute therefore -- seen --.

Column 5,
Line 12, after the words "gas compartment," delete [and] and substitute therefore -- an --.

Column 6,
Line 27, after the word "Although", delete [the].

Column 8,
Line 17, after the words "are defined by", delete [a].
Line 37, after the words "a contaminated", delete [a].
Line 57, after the words "comprise a", delete [(generally] and substitute therefore -- generally --.

Column 10,
Line 1, after the words "are defined by", delete [a].
Line 21, after the words "a contaminated", deleted [a].

Signed and Sealed this

Twenty-sixth Day of March, 2002

JAMES E. ROGAN
*Director of the United States Patent and Trademark Office*

*Attest:*

*Attesting Officer*